N. BARKER.
TEMPERATURE CONTROLLING DEVICE.
APPLICATION FILED NOV. 20, 1916.
1,224,862.
Patented May 1, 1917.
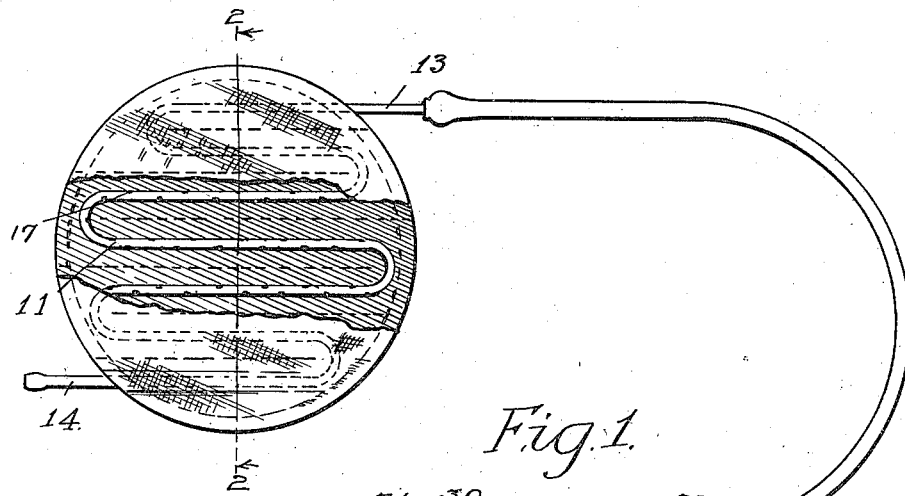
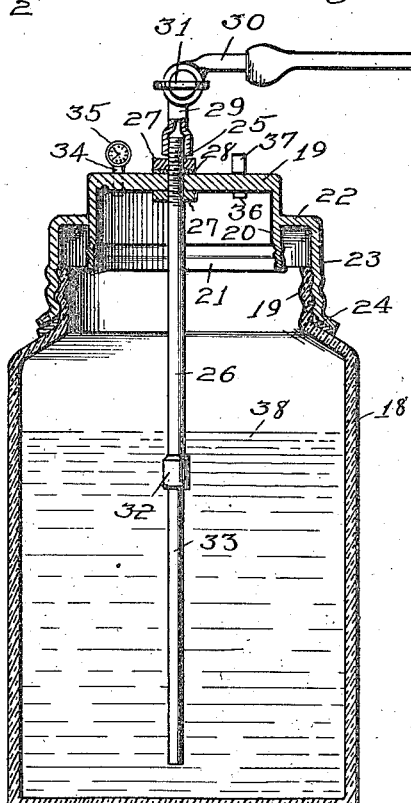
Witness
Al. Hague
Inventor
Noah Barker
by Quigg & Bair attys

UNITED STATES PATENT OFFICE.

NOAH BARKER, OF SEEVERS, IOWA.

TEMPERATURE-CONTROLLING DEVICE.

1,224,862.

Specification of Letters Patent.

Patented May 1, 1917.

Application filed November 20, 1916. Serial No. 132,504.

*To all whom it may concern:*

Be it known that I, NOAH BARKER, a citizen of the United States, and resident of Seevers, in the county of Jasper and State of Iowa, have invented a certain new and useful Temperature-Controlling Device, of which the following is a specification.

The object of my invention is to provide a device of simple, durable and inexpensive construction, for use in controlling the temperature of a patient. The device may be called a thermo-inhibitor.

A further object is to provide such a device including an absorbent pad with perforated tubes received therein, and a receptacle adapted to hold liquid under pressure, with means for connecting said tubes and said receptacle, including a controlling valve or the like for regulating the rate of flow from the receptacle.

Still a further object is to provide such a device having parts adapted for a variety of uses.

Still a further object is to provide a device including a receptacle cover, connecting tube and valve, and the pad with tubes therein, which may be used as an attachment with an ordinary thermos bottle or fruit jar.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a vertical, sectional view through a receptacle embodying a portion of my invention, suitably connected with a pad shown partially in section, and Fig. 2 shows a vertical, sectional view through the pad, taken on the line 2—2 of Fig. 1.

In the accompanying drawings I have used the reference numeral 10 to indicate generally a body of absorbent material through which is extended a tube 11 preferably of rigid or semi-rigid material coiled about in any suitable way through the absorbent material. The tube has the ends 13 and 14 projecting from the pad.

The pad has a top cover 15 of waterproof material, and a bottom cover 16 of absorbent material.

The coils of the tube 13 on the interior of the absorbent pad are provided with perforations or openings 17 to permit fluid to flow from the tube to the absorbent material of the pad.

The pad hereinbefore described is designed to be used in connection with a suitable receptacle such as an ordinary fruit jar or a thermos bottle. In Fig. 1 I have shown in vertical section a fruit jar 18 having the contracted, screw-threaded neck 19 of ordinary shape.

I provide a cap adapted for use either on a fruit jar or a thermos bottle, comprising the top disk-shaped member 19, having the downwardly extending annular flange 22 having at its periphery a downwardly extending flange 23 screw-threaded and adapted to fit a fruit jar. In the drawings I have shown the cap fitted on a fruit jar with a rubber gasket 24 between the lower part of the flange 23 and the lower part of the neck of the jar.

The screw-threaded end 25 of a tube 26 is screwed into and through the central portion of the cap. Above and below the cap on the tube 26 are lock nuts or the like 27. A gasket 28 may be placed around the tube 26 between one of the nuts 27 and the cap, for making a liquid tight joint.

Screwed onto the upper end of the tube 26 above the cap is a tube 29 having at its upper end a right-angled extension 30, and having between its ends a controlling valve 31. A suitable flexible tube 32 connects the end 30 with the end 13 of the tube 11.

The lower end of the tube 26 may be screwed into a fitting 32 and thereby connected with a second tube 33 which extends to the lower part of the receptacle 18.

A tube 34 extends from the disk portion 19 of the top of the cap and communicates with the interior of the receptacle, and has on its outer end a pressure gage 35. Extended through the cap is also a tube 36 having outside the cap a controlling valve 37. The tube 36 is used in pumping air into the receptacle.

In the practical use of my improved temperature controlling device the receptacle 18 is filled with fluid heated or cooled to the desired temperature. The fluid 38 is ordinarily left to stand below the top of the receptacle, the valve 31 is closed and air is then pumped into the top of the receptacle through the tube 36 for establishing the desired pressure, as indicated by the pressure gage 35. The parts are connected and the pad is laid on the patient with the bottom cover member 16 against the skin, whereupon the valve 31 may be turned for permitting the pressure to force the fluid into the tube 11 at any desired rate of speed. In other words, the fluid can be caused to flow into the pad drop by drop or at a more rapid speed. It will be seen that the flow of liquid will be constant and steady, and that the temperature of the pad will be substantially that of the liquid in the receptacle 18.

A device of this kind can be adapted to a great variety of uses. Cool water or other liquids may be used for cooling the skin of a fever patient. It is well known that the body will absorb a certain amount of water placed on the skin, and it will readily be seen that my improved device may be used for nourishing the body with water or other solutions.

The water will in many cases reduce the temperature. On the other hand, a comparatively warm temperature of the body may be maintained by placing in the receptacle 18 a solution or liquid heated to the desired temperature.

The waterproof cover 15 makes it possible to cover the patient in the ordinary way without danger of wetting the bed clothes or the patient's clothing.

Any desired degree of moisture in the pad may be maintained. The pad may be used as a cold or hot pack, as a hot or cold water bottle, and to take the place of ice packs and the like. The pads may be made of any suitable shape or size to fit different parts of the body.

Parts of the device may be used for a great variety of other purposes. By disconnecting the tube 32 from the end 13 of the tube 11 and connecting a syringe nozzle with the tube 32, the receptacle and top therefor may be used as a syringe and a steady flow maintained by the water pressure, or the receptacle may be elevated for causing flow. If desired it is obvious that the valve 37 may be opened for permitting the water to flow readily from the receptacle when the receptacle is elevated.

The device without the pad may be used as an irrigator or otherwise. I have found by many experiments that by using compressed air a very steady flow can be maintained.

It may be mentioned in this connection that the device without the pad may be used for making intravenous injections, inasmuch as the solution will flow from the receptacle through the tube 32 without air bubbles, which it is well known are extremely dangerous in the making of intravenous injections.

My pad may be used and the proper moisture and temperature thereof maintained in any position of the patient, and the receptacle may be placed in any suitable position without interfering in any way with the continuous and regular flow of the solution therefrom. The air pressure may be accurately observed by means of the pressure gage so that in case the pressure should become low and the flow of solution on that account diminished, the fact will be readily observed so that the additional compressed air may be forced into the receptacle.

Attention is called to the fact that the top or cover member is so made as to readily fit an ordinary thermos bottle or an ordinary Mason fruit jar or the like. I call attention to this as constituting one of the important advantages of my device, insomuch as it can be carried as a part of emergency or other equipment without carrying a large and bulky receptacle, inasmuch as the receptacle can usually readily be obtained.

I have so connected the device 26 and 33 together and also so mounted the tube 26 in the cover that they may be readily and easily taken apart for packing or storing or transporting the device in very small space and in convenient form.

Some changes may be made in the construction and arrangement of the various parts of my improved device without departing from the spirit and purposes of my invention, and it is my intention to cover by the patent to be issued hereon, any such modifications of structure or use of mechanical equivalents as may be reasonably included within the scope of my claims.

I claim as my invention:

1. In a device of the class described, an absorbent pad, a perforated tube therein, and means for supplying liquid to said tube.

2. In a device of the class described, an absorbent pad, a perforated tube therein, and means for supplying liquid under pressure to said tube.

3. In a device of the class described, an absorbent pad, a perforated tube therein, a receptacle adapted to hold liquid under pressure, a cover therefor, a tube extending from the lower part of said receptacle through said cover, means for connecting said last tube with said first tube, and an adjustable valve for controlling the flow of liquid from said receptacle through said tubes.

4. In a device of the class described, an absorbent pad, a perforated tube therein, a receptacle adapted to hold liquid under pressure, a cover therefor, a tube extending from the lower part of said receptacle through said cover, means for connecting said last tube with said first tube, an adjustable valve for controlling the flow of liquid from said receptacle through said tubes, and a pressure gage on said cover communicating with the interior of said receptacle.

5. In a device of the class described, an absorbent pad, a perforated tube therein, a receptacle adapted to hold liquid under pressure, a cover therefor, a tube extending from the lower part of said receptacle through said cover, means for connecting said last tube with said first tube, and an adjustable valve for controlling the flow of liquid from said receptacle through said tubes, said receptacle having a screw-threaded neck, said cover having a pair of spaced downwardly extending screw-threaded, annular flanges whereby the cover is adapted to fit on receptacles having necks of different sizes.

Des Moines, Iowa, November 9, 1916.

NOAH BARKER.